US012054365B2

(12) United States Patent
LaTendresse et al.

(10) Patent No.: US 12,054,365 B2
(45) Date of Patent: Aug. 6, 2024

(54) HOUSING ARRANGEMENT FOR A WEARPAD ASSEMBLY

(71) Applicant: Pettibone/Traverse Lift, LLC., Baraga, MI (US)

(72) Inventors: Philip E. LaTendresse, Chassell, MI (US); John C. Westman, Baraga, MI (US); Daniel P. Aho, Chassell, MI (US); Nate T. Simula, Atlantic Mine, MI (US)

(73) Assignee: Pettibone/Traverse Lift, LLC., Baraga, MI (US)

( * ) Notice: Subject to any disclaimer, the term of this patent is extended or adjusted under 35 U.S.C. 154(b) by 1057 days.

(21) Appl. No.: 16/925,838

(22) Filed: Jul. 10, 2020

(65) Prior Publication Data

US 2020/0339392 A1 Oct. 29, 2020

Related U.S. Application Data

(63) Continuation of application No. 16/193,932, filed on Nov. 16, 2018, now Pat. No. 10,710,848.

(60) Provisional application No. 62/587,927, filed on Nov. 17, 2017.

(51) Int. Cl.

| | |
|---|---|
| ***B66C 23/70*** | (2006.01) |
| ***B66F 9/065*** | (2006.01) |
| *E02F 3/28* | (2006.01) |
| *E02F 3/30* | (2006.01) |
| *E02F 3/38* | (2006.01) |

(52) U.S. Cl.
CPC .......... *B66C 23/707* (2013.01); *B66F 9/0655* (2013.01); *E02F 3/286* (2013.01); *E02F 3/306* (2013.01); *E02F 3/386* (2013.01)

(58) Field of Classification Search
None
See application file for complete search history.

(56) References Cited

U.S. PATENT DOCUMENTS

| | | | | |
|---|---|---|---|---|
| 3,690,742 | A | 9/1972 | Sung | |
| 3,788,492 | A * | 1/1974 | Kraft | B66F 9/061 212/292 |
| 4,257,201 | A * | 3/1981 | Landolt | B66C 23/707 212/230 |
| 4,406,375 | A | 9/1983 | Hockensmith | |
| 4,483,109 | A * | 11/1984 | MacDonald | B66C 23/708 212/292 |
| 4,759,452 | A * | 7/1988 | Faint | F16C 29/02 52/118 |
| 5,158,189 | A | 10/1992 | Watson et al. | |
| 5,829,606 | A | 11/1998 | Erdmann | |
| 5,865,328 | A | 2/1999 | Kaspar | |
| 6,062,404 | A | 5/2000 | Erdmann | |
| 6,499,612 | B1 | 12/2002 | Hamgington et al. | |

(Continued)

*Primary Examiner* — Joshua K Ihezie

(74) *Attorney, Agent, or Firm* — Shook, Hardy & Bacon L.L.P.

(57) ABSTRACT

A housing arrangement for a wearpad may include a boom for a telescopic boom assembly; a plate for contacting at least one end of the wearpad when the wearpad is installed adjacent to the boom; and a fastener for securing the plate to a surface of the boom. Optionally, at least one of the plate and the boom includes a tab, where the other of the plate and the boom includes a slot, and where the slot is configured to constrain the tab in at least two directions when the slot receives the tab.

8 Claims, 12 Drawing Sheets

(56) References Cited

U.S. PATENT DOCUMENTS

| | | | | |
|---|---|---|---|---|
| 7,293,377 | B2 | 11/2007 | Pinther, II et al. | |
| 8,439,566 | B2 | 5/2013 | Connell | |
| 8,678,210 | B1 | 3/2014 | Harrington et al. | |
| 8,783,344 | B2 | 7/2014 | Aung et al. | |
| 8,801,354 | B2 * | 8/2014 | Lettau | B66F 9/0655 384/42 |
| 10,710,848 | B2 * | 7/2020 | LaTendresse | B66F 9/0655 |
| 11,041,526 | B1 * | 6/2021 | Calago | F16C 29/02 |
| 11,111,115 | B2 * | 9/2021 | Calaman | B66C 23/701 |
| 2006/0226107 | A1 | 10/2006 | Brinkmann et al. | |
| 2012/0085723 | A1 * | 4/2012 | Willim | B66C 23/72 212/348 |
| 2012/0251284 | A1 * | 10/2012 | Lettau | B66F 9/0655 384/42 |
| 2016/0130119 | A1 | 5/2016 | Fortunato et al. | |
| 2018/0251348 | A1 | 9/2018 | Calaman et al. | |

* cited by examiner

HOUSING ARRANGEMENT FOR A WEARPAD ASSEMBLY

RELATED APPLICATIONS

This application is a continuation of U.S. Ser. No. 16/193,932, filed Nov. 16, 2018 (and issuing as U.S. Pat. No. 10,710,848), which claims the benefit of U.S. Provisional Application No. 62/587,927, filed Nov. 17, 2017. All applications listed in this paragraph are hereby incorporated by reference in their entireties.

BACKGROUND

The present embodiments relate generally to a handling machine, such as an extendable forklift. Handling machines often include extendable, telescoping boom assemblies with forklift attachments or other attachments for reaching, lifting, moving, and otherwise handling pallets and/or other objects. When handling machines operate hydraulically, they typically include multiple hydraulic cylinders that can be controlled and actuated by a user within the passenger compartment of the handling machine to ultimately position the attachment, e.g., a fork frame, by extending or retracting the booms.

Since the booms are movable relative to one another, wearpads are often included between inner and outer booms. Wearpads may provide a suitable friction between the respective booms to protect the booms from wear and damage. The wearpads are typically designed to be low-cost and replaceable such that they can be periodically replaced, thus increasing the lifespan of the other components (such as the booms themselves). While using replaceable wearpads has been successful in the past, current wearpads have been found to focus forces and stress in certain locations when the boom assembly experiences a heavy load, which may diminish the lifespan of the wearpad and potentially cause wear or damage to the booms. Further, replacing current wearpads has been found to be difficult, particularly when specialized tools are not available and/or multiple operators are not present.

In view of this background, it would be advantageous to provide an improved wearpad that provides an improved distribution of stress, and also an improved wearpad housing arrangement to simplify wearpad replacement.

BRIEF SUMMARY

In one aspect, the present disclosure provides a wearpad for a telescopic boom assembly. The wearpad may include a first surface for contacting an outer boom of the boom assembly, a second surface for contacting an inner boom of the boom assembly, and a length, where the first surface and the second surface extend along the length, and where the length extends along a longitudinal direction of a boom assembly. The wearpad may further include a chamfered portion with a first end at a first location along the length and a second end at a second location along the length. The first surface and the second surface may converge along the chamfered portion. Thus, a first distance between the first surface and the second surface at the first end of the chamfered portion may be greater than a second distance between the first surface and the second surface at the second end of the chamfered portion.

In another aspect of the present disclosure, a wearpad for a telescopic boom assembly may include a first surface for contacting an outer boom of the boom assembly and a second surface for contacting an inner boom of the boom assembly. The wearpad may further include a third surface for contacting the outer boom of the boom assembly and a fourth surface for contacting the inner boom of the boom assembly. The first surface may be perpendicular to the third surface, and the second surface may be perpendicular to the fourth surface.

In another aspect, the present disclosure provides a housing arrangement for a wearpad. The housing arrangement may include a boom for a telescopic boom assembly and a plate for contacting at least one end of the wearpad when the wearpad is installed adjacent to the boom. A fastener may be included for securing the plate to a surface of a boom. At least one of the plate and the boom may include a tab, and the other of the plate and the boom may include a slot, where the slot is configured to constrain the tab in at least two directions when the slot receives the tab.

DETAILED DESCRIPTION

Figure 1:
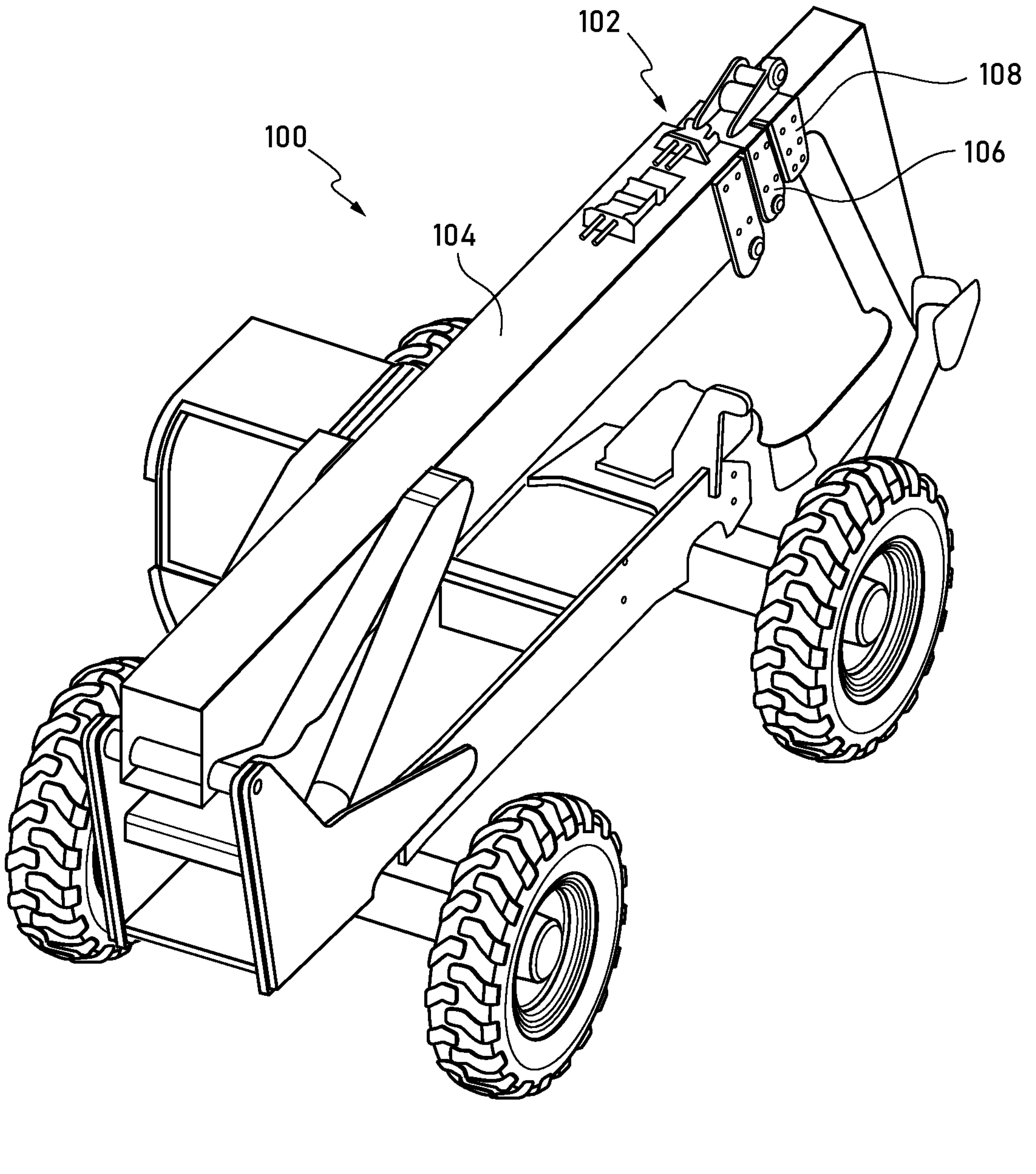
FIG. 1 is an illustration showing a perspective view of an example of a handling machine with a telescopic boom assembly in accordance with certain embodiments of the present disclosure.

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

FIG. 1 is an illustration showing a perspective view of a handling machine 100 with a telescopic boom assembly 102. While the present disclosure may be applicable to any suitable handling machine with a telescopic boom assembly, one example is a Extendo Series Telehandler sold by Pettibone® of Baraga, Mich. As shown, the telescopic boom assembly 102 may include a plurality of booms that can extend in a telescoping manner such that the total length of the boom assembly 102 is adjustable. As shown, the boom assembly 102 may include a first boom 104, a second boom 106, and a third boom 108, but it is also contemplated that fewer or more than three booms may be included. For purposes of this disclosure, an "inner boom" is at least partially encompassed by an "outer boom" in a default or non-extended state, and then extends from an opening of the "outer boom" when in a telescopic or extended state. Thus, the first boom 104 is an "outer boom" with respect to the second boom 106 and the third boom 108, the second boom 106 is an "inner boom" with respect to the first boom 104 and an outer boom with respect to the third boom 108, and the third boom 108 is an "inner boom" with respect to the first boom 104 and the second boom 106.

Figure 2:
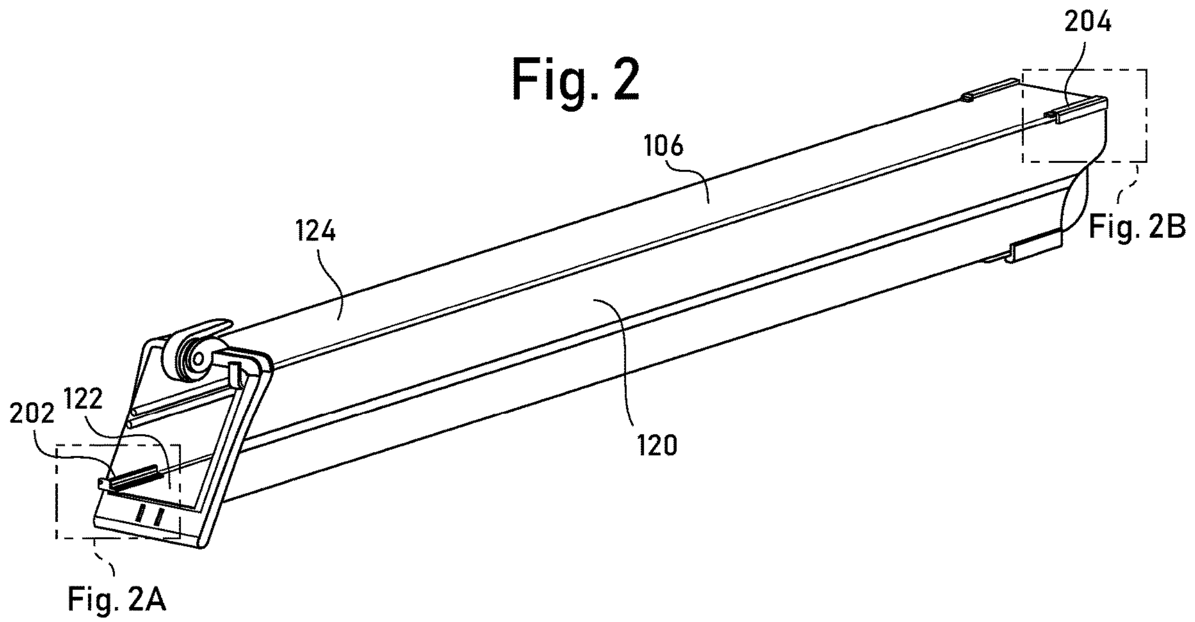
FIG. 2 is an illustration showing a perspective view of a boom for a telescopic boom assembly with inner and outer wearpads in accordance with certain embodiments of the present disclosure.
Figure 2A:
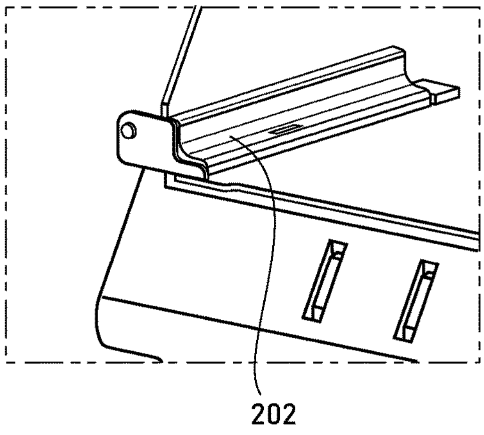
FIGS. 2A-2B are illustrations showing magnified views of the respective inner and outer wearpads depicted in FIG. 2.
Figure 2B:
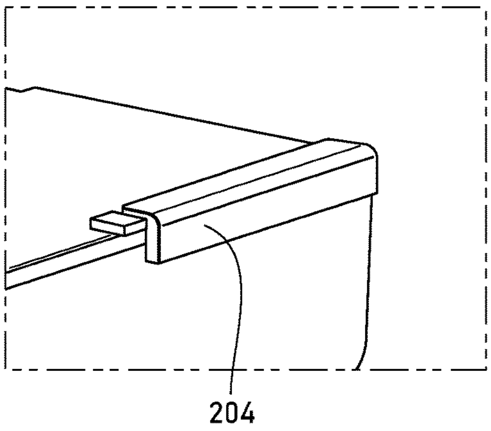

FIG. 2 is an illustration showing a perspective view of the second boom 106 for the telescopic boom assembly 102 (of FIG. 1), where a set of inner wearpads 202 are located in the opening of the second boom 106 and a set of outer wearpads 204 are located on an outer perimeter of the second boom 106. When incorporated into the boom assembly 102 (FIG. 1), the wearpads 202 may be located between the second boom 106 and the third boom 108, and the wearpads 204 may be located between the first boom 104 (FIG. 1) and the second boom 106. Among other functions, the wearpads 202, 204 may prevent direct contact between respective booms, reduce friction as the respective booms move relative to each other, create space between respective booms for other components (e.g., wires, pneumatic components, etc.), and may be relatively low in cost and replaceable to protect higher-cost components (such as the booms themselves). While any suitable material is contemplated, in certain non-limiting exemplary embodiments, the wearpads 202, 204 may be made from nylon (e.g., a cast nylon with or without reinforcement) that has a very low compressibility (i.e., deforms very little under a compression load) and a very high compression strength and a high bushing PV value. While not shown in FIG. 2, the first boom 104 and/or the third boom 108 shown in FIG. 1 may also be secured to similar wearpads. FIGS. 2A-2B are magnified views of a wearpad 202 and a wearpad 204, respectively.

Figure 3:
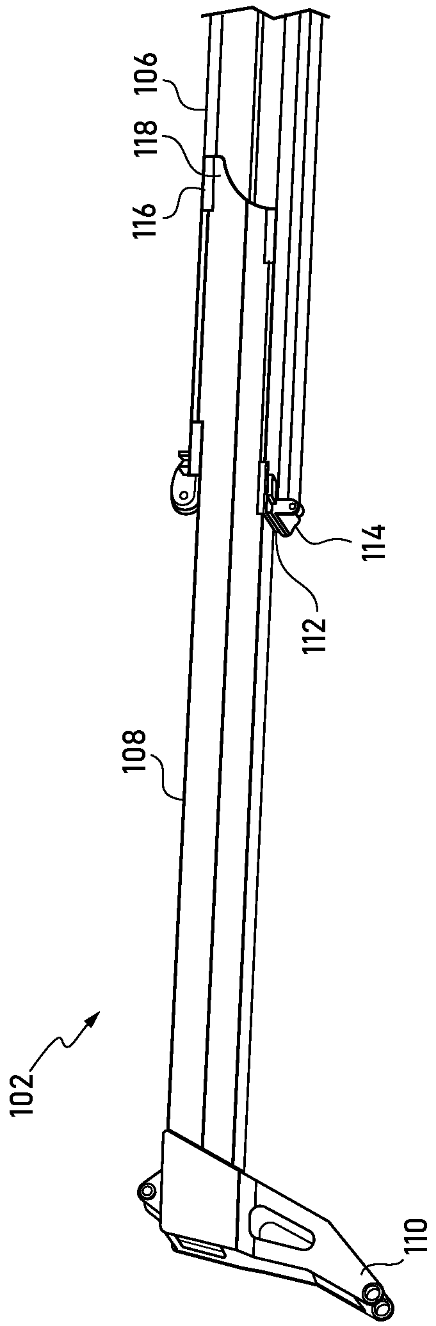
FIG. 3 is an illustration showing a side view of a portion of a boom assembly in an extended state.

FIG. 3 is an illustration showing a side view of a portion of the boom assembly 102, where the third boom 108 is in an extended state with respect to the second boom 106. Typically, when a flat wearpad is used between the third boom 108 and the second boom 106, and when a vertical load is applied to an end 110 of the extended boom (such as when the end 110 of the third boom 108 lifts an object), the highest stresses at the junction of third boom 108 and the second boom 106 may be highly focused on a first location 112 adjacent to the bottom side of the boom assembly 102 at an end 114 of the second boom 106, and also (to a lesser extend) at a second location 116 on a top side of the boom assembly 102 at an end 118 of the third boom 108.

Figure 4:
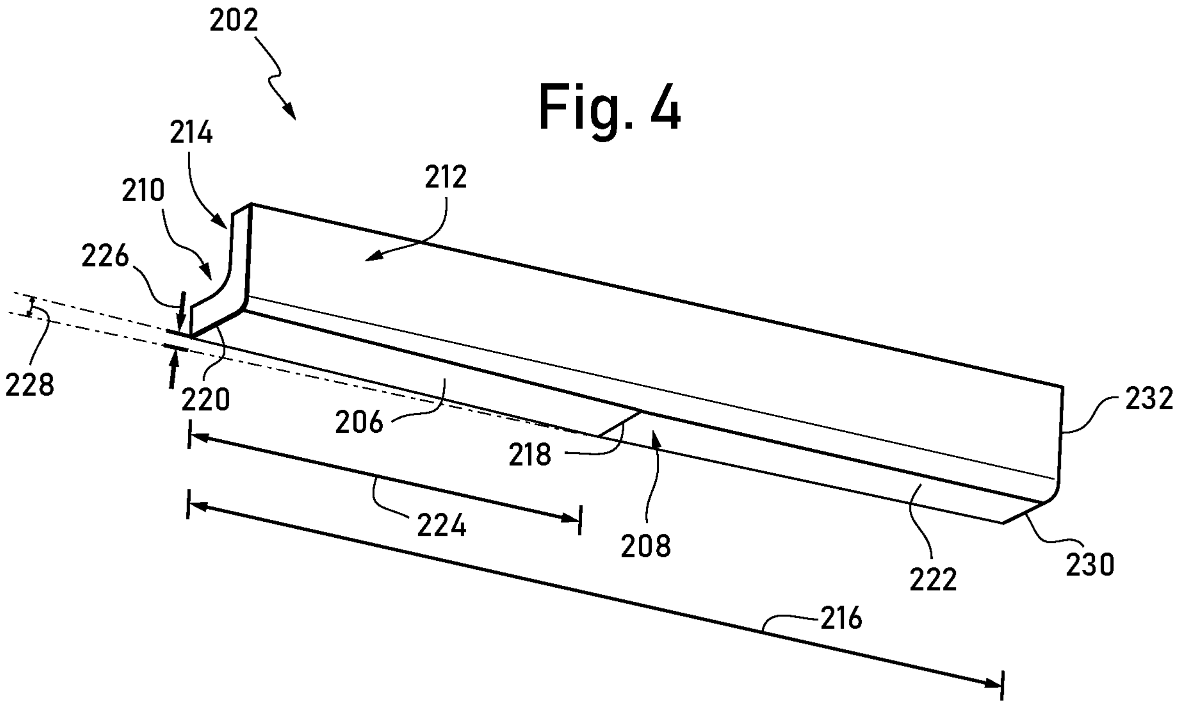
FIG. 4 is a perspective view showing an L-shaped wearpad in accordance with certain embodiments of the present disclosure.

To distribute the above-described stresses, the wearpad 202 used between the respective booms may include a chamfered portion 206 as depicted in FIG. 4, which is an illustration showing a perspective view of the wearpad 202 (also depicted in FIG. 2). Each of the features with respect to the wearpad 202 of FIG. 4 described below (and particularly the L-shaped profile and presence of a chamfered portion) may also apply to other wearpads (e.g., wearpads 204 of FIG. 2).

As shown in FIG. 4, the wearpad 202 may include a first surface 208 for contacting an outer boom and a second surface 210 for contacting an inner boom of the boom assembly 102. The first surface 208 and the second surface 210 may extend along a length 216 of the wearpad 202, where the length 216 is parallel to, and extends along, a longitudinal direction of a boom assembly 102 when the wearpad 202 is installed. In some embodiments, a chamfered portion 206 of the wearpad 202 may have a first end 218 at a first location along the length 216 and a second end 220 at a second location along the length 216, and the first surface 208 and second surface 210 may converge from the first end 218 to the second end 220. In other words, the first surface 208 and the second surface 210 may be farther apart at the first end 218 than they are at the second end 220. When installed on a boom of the boom assembly 102 (for example, as shown in FIG. 2), the second end 220 of the chamfered portion 206 may be closer to the adjacent end of the respective boom, and the first end 218 may be closer to the middle and opposite (farther) end of the boom.

In some embodiments, the wearpad 202 may include a second portion 222 adjacent to the chamfered portion 206. The first surface 208 and the second surface 210 may be parallel in the second portion 222. Advantageously, the second portion 222 may provide the wearpad 202 with a suitable length to ensure proper spacing between the respective booms along with suitable strength, durability, and longevity of the wearpad 202. The second portion 222 and the chamfered portion 206 may be positioned such that the chamfered portion 206 is closer to an adjacent end of the respective boom when installed (as shown in FIG. 2). Thus, the first end 218 of the chamfered portion 206 may define the terminus of the second portion 222.

Referring to the chamfered portion 206, a distance 224 (i.e., parallel to the length 216) from the first end 218 of the chamfered portion 206 to the second end 220 of the chamfered portion 206 may be substantially greater than the chamfer displacement 226. Herein, the "chamfer displacement" is the amount that the respective surfaces (in this case the first surface 208 and the second surface 210) converge from the first end 218 of the chamfered portion 206 to the second end 220 of the chamfered portion 206. That is, the "chamfer displacement" is the difference between the distance between the first and second surfaces 208, 210 at the first end 218 and the distance between the first and second surfaces 208, 210 at the second end 220. In some embodiments, the distance 224 is at least about 10 times as large as the chamfer displacement 226, and it may be even substantially larger than that (e.g., at least 25 times as large, at least 50 times as large, at least 75 times as large, at least one hundred 100 times as large, at least one-hundred and fifty 150 times as large, at least two hundred 200 times as large, or even larger). In certain non-limiting exemplary embodiments, the distance 224 is at least about 2 inches, such as at least about 3 inches (and such as about 6 inches in one exemplary embodiment). Another potential way to define the shape and size of the chamfered portion 206 is a chamfer angle 228. The chamfer angle 228, which is dependent on the distance 224 and the chamfer displacement 226, may be less than about 5 degrees, such as less than about 2 degrees, and more particularly less than about 1 degree.

For example, in one embodiment analyzed by the inventors (e.g., through finite element analysis), the distance 224 was about 6 inches in length, and the chamfer displacement 226 was about 0.060 inches in length (such that the distance 224 was about one hundred (100) times as large as the chamfer displacement 226, and such that the chamfer angle 228 was about 0.057 degrees). When a load was placed on an outer boom, the maximum stress at a single point of the about 40 ksi (i.e., kilopound per square inch). This embodiment reduced (by 67.5%) the maximum stress at a single location from a baseline of about 123 ksi, where the baseline involved the same load but used a wearpad without a chamfered portion (but otherwise having the same shape and dimensions). Advantageously, this reduction in point stress may substantially increase the longevity and durability of the wearpad 202 and also the associated booms, thus reducing downtime due to maintenance due to component fatigue, mechanical failure, etc.

Further, instead of including flat wearpads at a centralized location between corners of the boom (which is typical in the industry), the wearpad 202 may have an L-shaped cross-section with a base portion 230 and a perpendicular side portion 232 such that it is configured (sized and shaped) to surround a corner of the boom assembly 102. In other words, the wearpad 202 may further include a third surface 212 for contacting the outer boom and a fourth surface 214 for contacting the inner boom. The first surface 208 may be perpendicular to the third surface 212, and the second surface 210 may be perpendicular to the fourth surface 214. Thus, the wearpad 202 may be associated with a corner of the boom assembly 102, and four wearpads 202 may be used to space the respective booms (as shown in FIG. 2). Still referring to FIG. 2, the wearpads 202, 204 on the left and right side of the boom assembly 102 may be mirror images (and the same could be true of the wearpads 202, 204 respectively on the top and bottom of the boom assembly 102 in some embodiments). Advantageously, by placing the wearpads 202, 204 at the corners of the boom assembly, a substantial portion of the force distributed to the second boom 106 may be distributed to the vertical side walls 120 rather than the bottom plate 122 and top plate 124. Thus, it is contemplated that the bottom plate 122 and/or the top plate 124 may use a lighter, cheaper material, and/or the boom assembly may be capable of handling larger loads without change boom materials.

Figure 5:
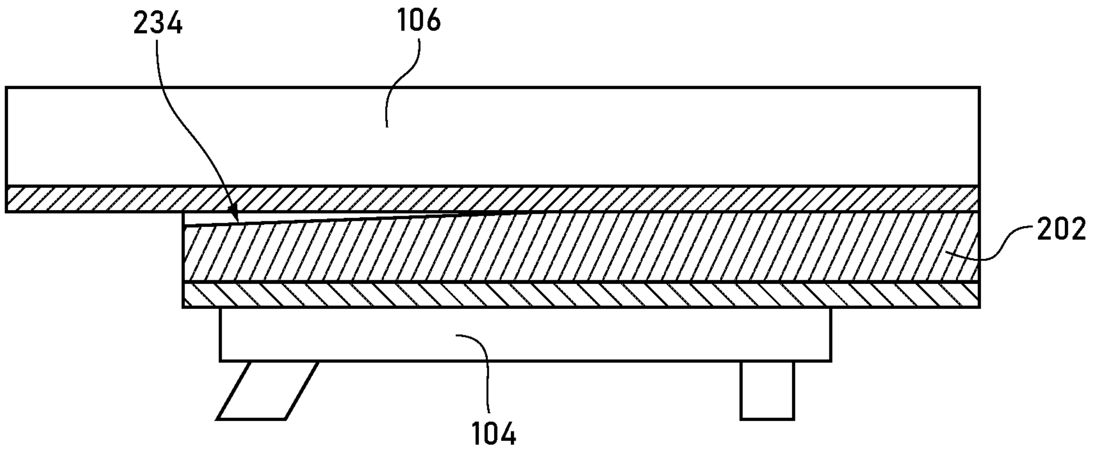
FIG. 5 is an illustration showing a side view of an outer boom, an inner boom, and a wearpad located therebetween, where the wearpad includes an angled top surface in accordance with certain embodiments of the present disclosure.
Figure 6:
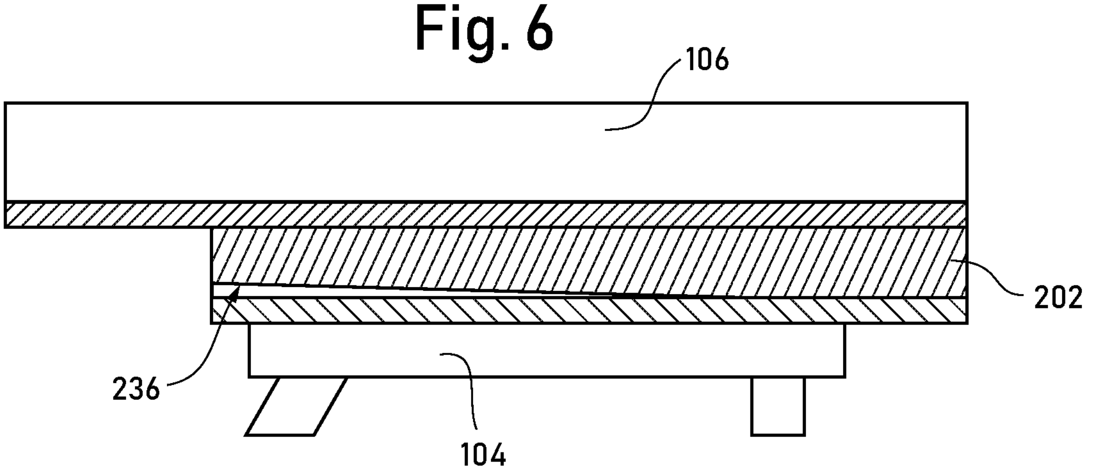
FIG. 6 is an illustration showing a side view of an outer boom, an inner boom, and a wearpad located therebetween, where the wearpad includes an angled bottom surface in accordance with certain embodiments of the present disclosure.

FIGS. 5-6 are illustrations showing a side view of an outer boom 104, an inner boom 106, and a wearpad 202 located therebetween. As shown in FIG. 5, the chamfered portion 206 of the wearpad 202 may include an angled top surface 234 (i.e., facing the inner boom 106). In other embodiments, such as the embodiment shown in FIG. 6 the bottom surface 236 (i.e., facing the outer boom 104) may be angled at the chamfered portion 206. It is also contemplated that both of the surfaces may be angled at the chamfered portion 206. All of these embodiments are associated with the advantage of reducing the maximum stress experienced when the inner boom 106 is extended and experiences a load.

Figure 7A:
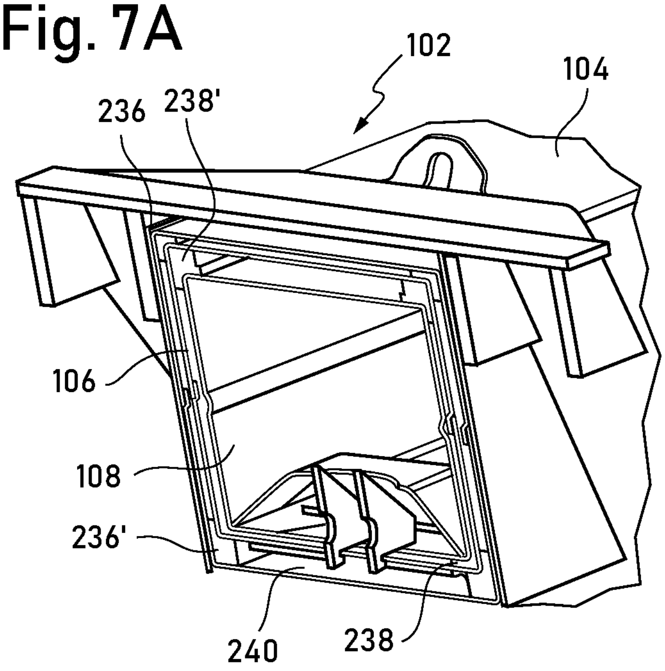
FIGS. 7A-7B are illustrations showing perspective views of a rear section and a front section of a boom assembly with L-shaped wearpads in accordance with certain embodiments of the present disclosure.
Figure 7B:
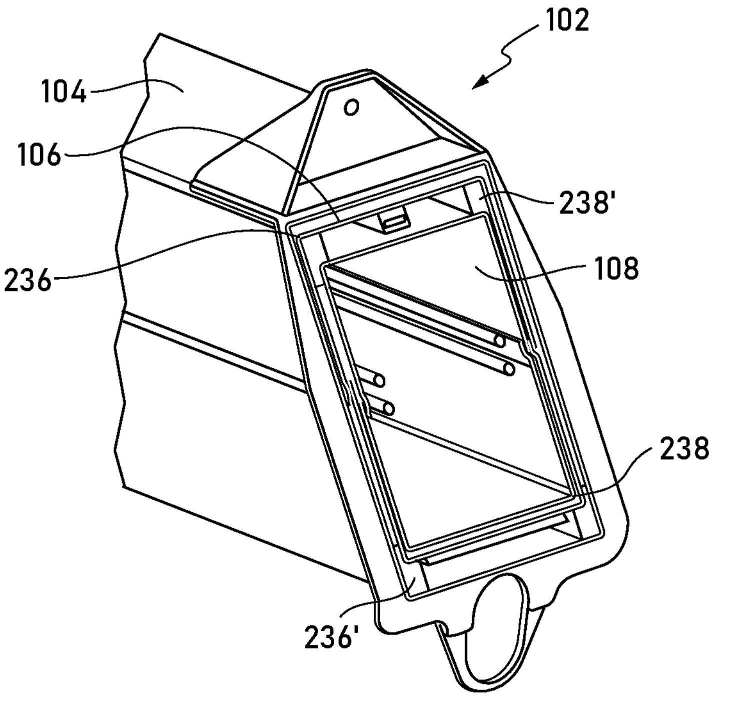

FIGS. 7A-7B are illustrations showing perspective views of a rear section and a front section of the boom assembly 102 having a first set of wearpads 236 located between the first boom 104 and the second boom 106 and a second set of wearpads 238 located between the second boom 106 and the third boom 108. As shown, certain wearpads 236, 238 may have different cross-sections to create additional space adjacent to a boom. For example, referring to FIG. 7, the wearpads 236 located on the top side of the boom assembly 102 between the first boom 104 and the second boom 106 have a relatively thin base portion (i.e., the portion oriented horizontally in FIGS. 7A-7B) such that the first boom 104 and the second boom 106 are relatively close on the top side of the boom assembly 102. Wearpads 238 with similar dimensions are located between the second boom 106 and the third boom 108 on the bottom side of the boom assembly 102.

In contrast, the wearpads 236' between the first boom 104 and the second boom 106 on the bottom side of the boom assembly 102 have a base portion with a thick cross section, thus providing a larger space 240 between the first boom 104 and the second boom 106 on the bottom side of the boom assembly 102. This may be advantageous for providing space for wires, sensors, hydraulic equipment, and the like. Wearpads 238' with similar dimensions are located between the second boom 106 and the third boom 108 on the top side of the boom assembly 102. When a wearpad 236', 238' has a base with a relatively large thickness, the thickness of the base portion may be at least about 1.5 times as large as the side portion, such as about 2 times as large, or even about 3 times as large (or larger) than the side portion.

While not shown, it is also contemplated that certain wearpads may have side portions with different dimensions to provide additional space between respective boom sidewalls. This may occur instead, or in addition to, the spaces provided as shown in FIGS. 7A-7B.

Figure 8A:
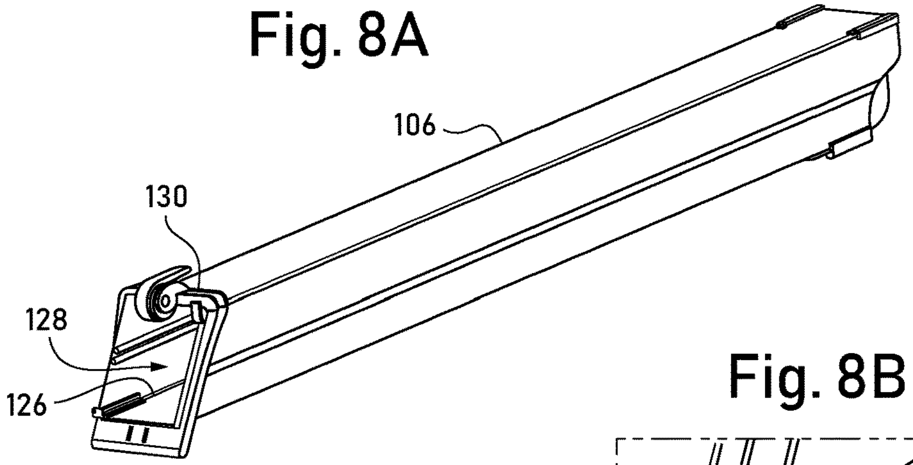
FIGS. 8A-E are illustrations showing various views of a housing arrangement for a wearpad in accordance with certain embodiments of the present disclosure.
Figure 8B:
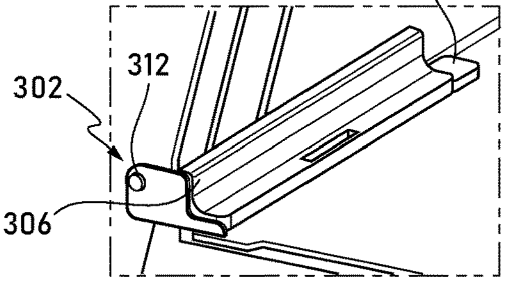
Figure 8C:
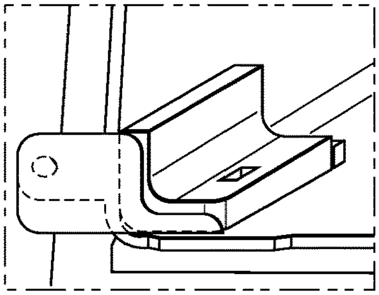
Figure 8D:
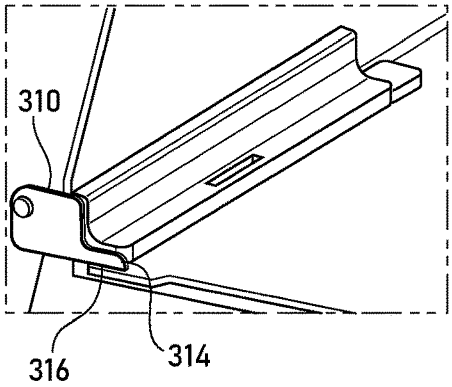
Figure 8E:
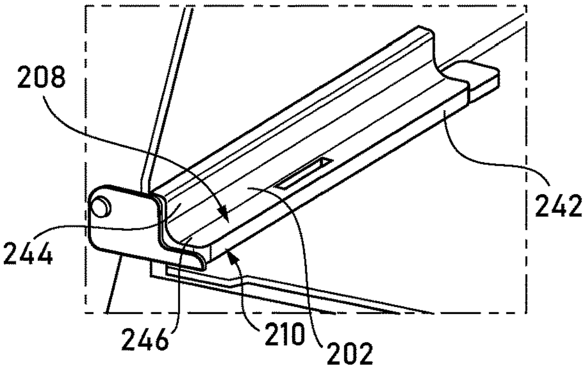

FIGS. 8A-E are illustrations showing various views of a housing arrangement 302 for the wearpad 202. The housing arrangement 302 may be used for wearpads installed on an inner corner 126 of a boom 106, as shown. To constrain the wearpad 202 along the length of the boom 106, a fixed member 304 may contact a first end 242 of the wearpad 202 inside the opening 128 of the boom 106. At the end 130 of the boom 106, a removable plate 306 may be positioned to contact the second end 244 of the wearpad 202 such that the wearpad 202 cannot slide out of the opening 128. As shown in FIG. 8C, the profile of the removable plate 306 may be sized and positioned such that it remains clear of the first surface 208 and the third surface 212 (which are configured to contact an inner boom). The remaining degrees of freedom of the wearpad 202 may be constrained by the inner and outer booms themselves once the wearpad 202 is installed. In some embodiments, the wearpad 202 may define an opening 246 (here extending from the first surface 208 to the second surface 210) to receive a fastener (e.g., a screw, clip, clamp, etc.), which may be advantageous for providing temporary constraint prior to the booms being properly positioned to fully constrain the wearpad 202. The fastener may fix the plate 306 with respect to a surface of an extension 310 (or other surface) of the boom 106.

To optimize installation and removal time, the removable plate 306 may be released/installed through respective removal/deployment of only one fastener 312 (e.g., a bolt, clamp, pin, etc.). However, to enhance securement of the plate 306 with respect to the boom 106, the plate 306 may include a tab 314 that is associated with a slot 316 formed in the boom 106. Thus, when installing the plate, a user can insert the tab 314 within the slot 316 and then tighten the fastener 312 to efficiently and quickly secure the wearpad 202 in place. The slot 316 may constrain the tab 314 in at least two directions even before tightening the fastener 312. While not shown, it is contemplated that the tab 314 and slot 316 may be switched around (i.e., the slot 316 may be included in the plate 306, and the tab 314 may be included with the boom 106).

Figure 9A:
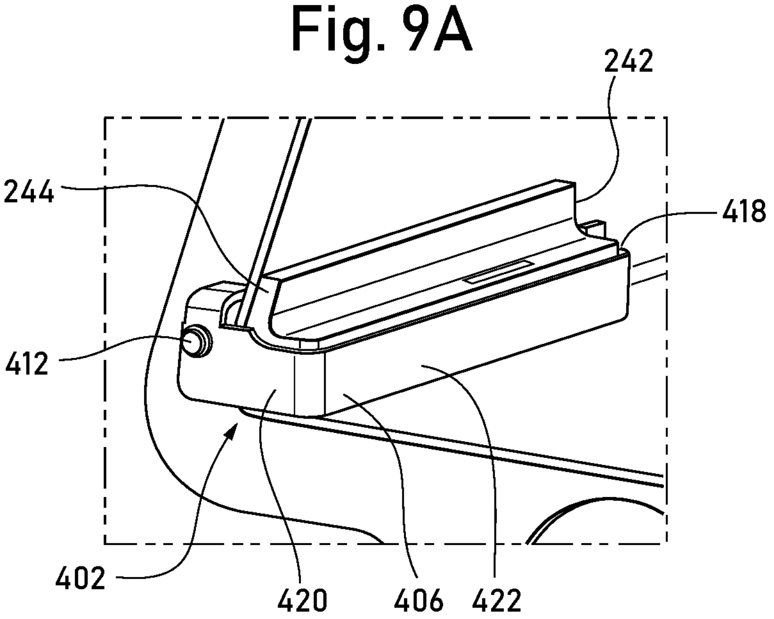
FIGS. 9A-B are illustrations showing various views of another embodiment of a housing arrangement for a wearpad in accordance with certain embodiments of the present disclosure.
Figure 9B:
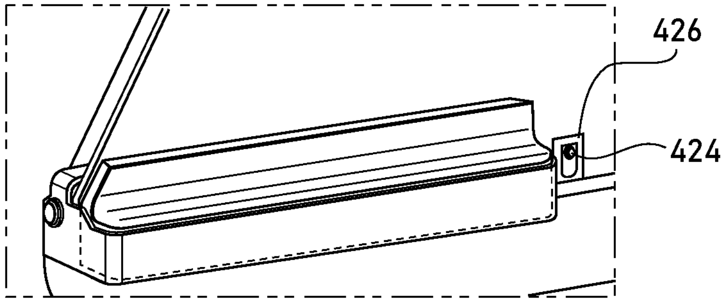
Figure 10A:
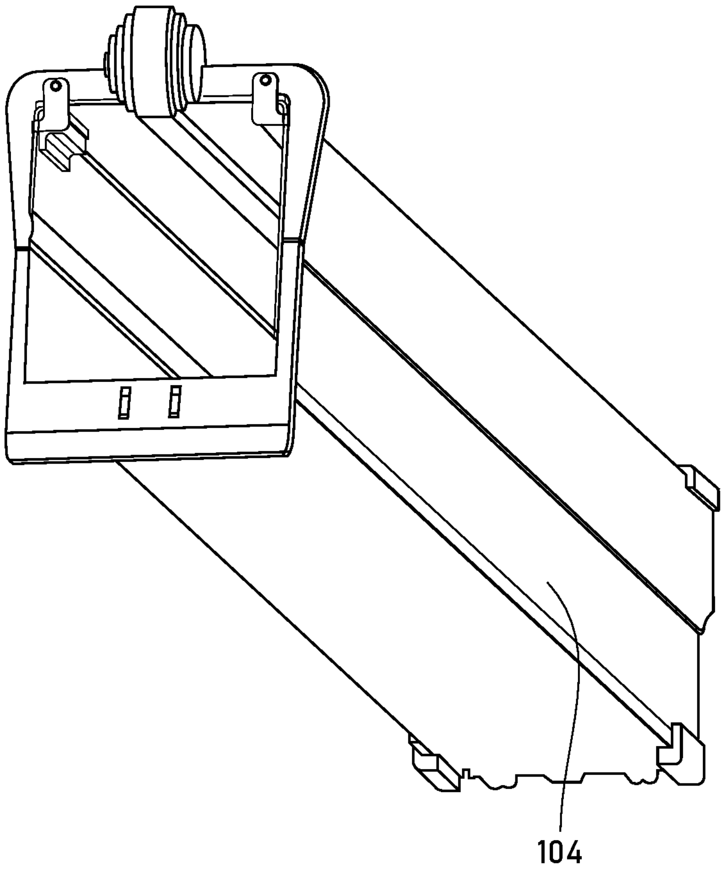
FIGS. 10A-E are illustrations showing various views of another embodiment of a housing arrangement for a wearpad in accordance with certain embodiments of the present disclosure.
Figure 10B:
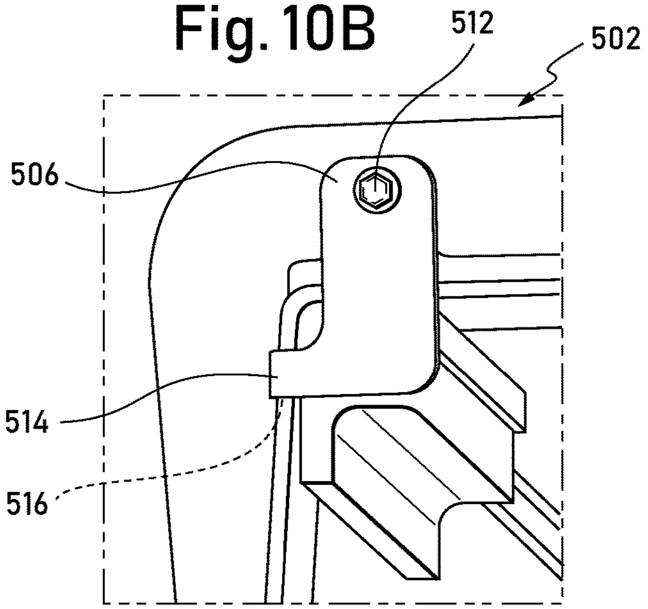
Figure 10C:
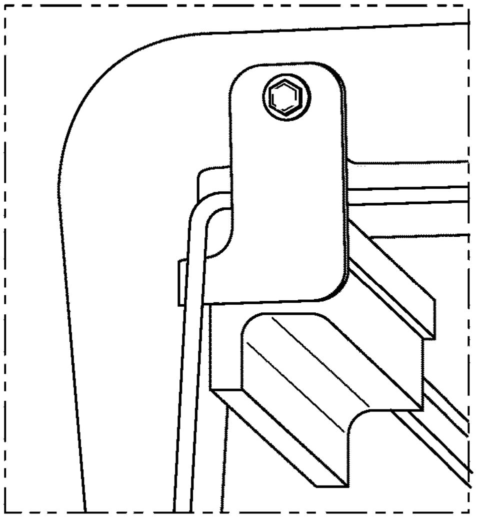
Figure 10D:
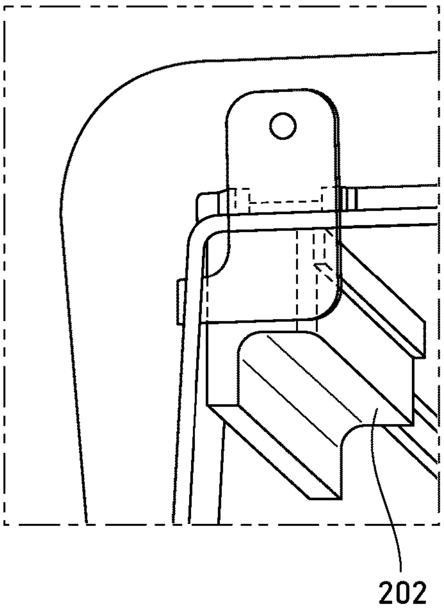
Figure 10E:
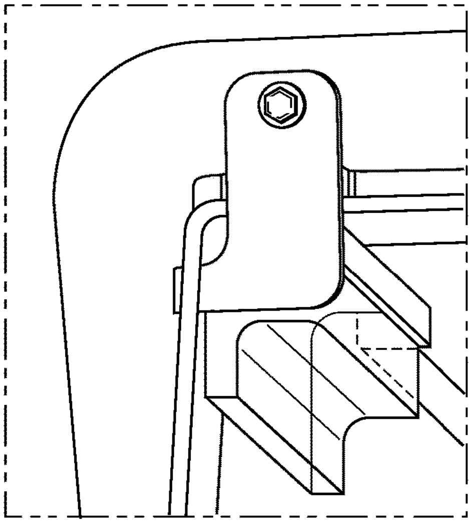
Figure 11A:
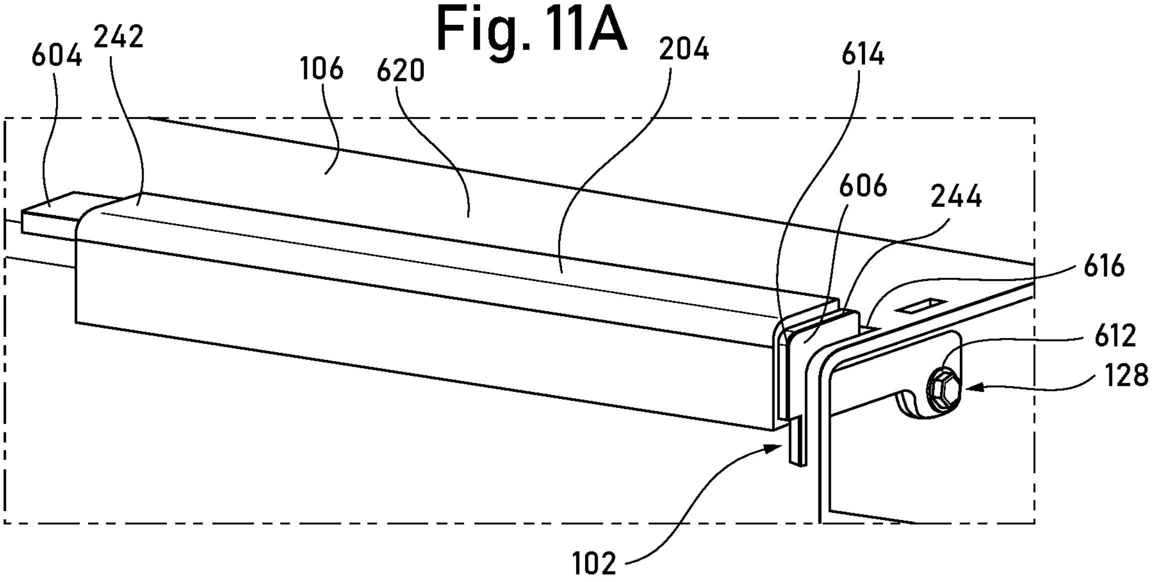
FIGS. 11A-D are illustrations showing various views of another embodiment of a housing arrangement for a wearpad in accordance with certain embodiments of the present disclosure.
Figure 11B:
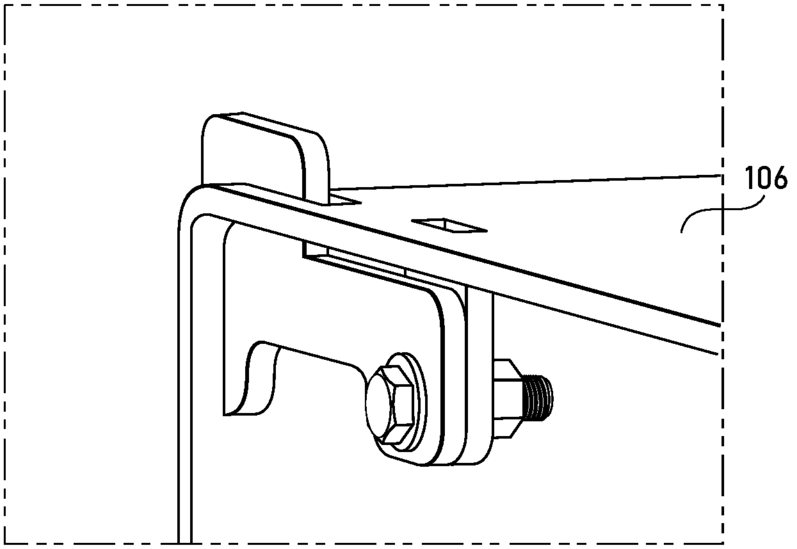
Figure 11C:
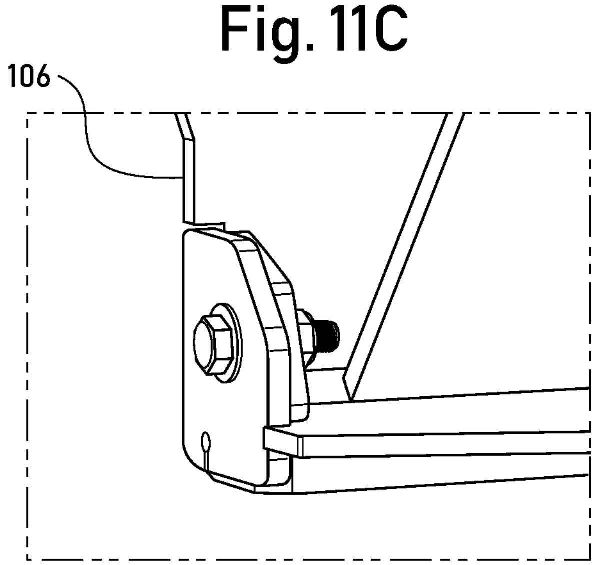
Figure 11D:
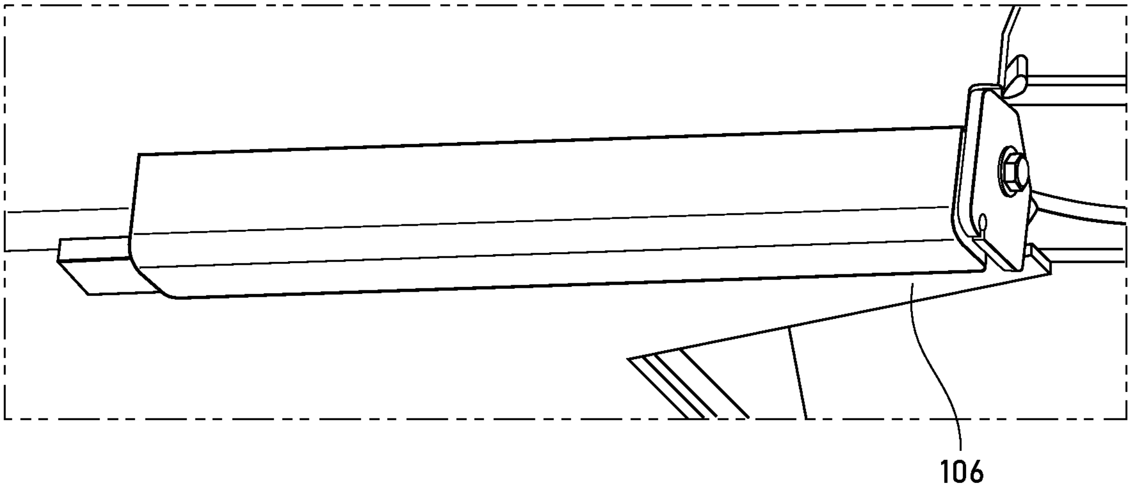

FIGS. 9A-B are illustrations showing various views of another embodiment of a housing arrangement 402 for the wearpad 202. This embodiment may be particularly suitable for a wearpad 202 having a relatively thick base portion (as described in more detail above). As shown, the housing arrangement may include a bracket or plate 406 with a first portion 418 for constraining a first end 242 of the wearpad 202, a second portion 420 for constraining the second end 244 of the wearpad 202, and a middle portion 422 extending from the first portion 418 to the second portion 420 (and the middle portion 422 may optionally constrain the wearpad 202 along its length).

The first portion 418 of the plate 406 may be fixed to an extension having an opening (or "slot" for purposes of this disclosure) for receiving a pin 424 (which may be considered a "tab" for purposes of this disclosure), where the pin 424 is fixed to the boom 106. Alternatively, the pin 424 may be fixed to the extension 426 of the plate 406 and the opening may be defined by the sidewall of the boom 106. The pin 424 and associated opening may constrain the plate 406 along the longitudinal direction of the boom 106. Thus, one difference between this embodiment and the embodiment of FIGS. 8A-E is that the "tab" and "slot" are located adjacent to an end of the wearpad opposite the fastener (i.e., the fastener is adjacent to the second end 244 and the "tab" and "slot" are located adjacent to the first end 242).

Further, the second portion 420 of the plate 406 may have an opening or other element associated with the fastener 412, which may be similar to the fastener of the plate 306 of FIGS. 8A-E. Advantageously, the single fastener may be used to fully constrain the plate 406, and thus also the wearpad 202, which is advantageous for the reasons discussed above.

FIG. 10A-E are illustrations showing various views of another embodiment of a housing arrangement 502 for the wearpad 202, which may be used when the wearpad 202 is located on a top side of the boom 104 (or, alternatively/additionally, the bottom side). As shown, like the embodiments described above, a plate 506 may be used to constrain the wearpad 202 in the longitudinal direction of the boom 104. However, instead of (or in addition to) a pin (as shown in FIGS. 9A-B), constraint of the plate 506 in the longitudinal direction may be accomplished by a tab 514 and slot 516 (similar to the embodiment of FIGS. 8A-E). Like the other embodiments, the plate 506 may be associated with a single fastener 512.

FIGS. 11A-D are illustrations showing various views of another embodiment of a housing arrangement 602 for a wearpad 204. This embodiment may be particularly suited to house a wearpad 204 that is attached to an outer perimeter of the boom 106, as shown. The housing arrangement 602 may include a fixed member 604 that constrains the first end 242 of the wearpad 204 and a plate 606 that constrains the second end 244 of the wearpad 204. Like the other embodiments described above, the plate 606 may be associated with one fastener, and may include a tab 614 that is associated with a slot 616 through a wall of the boom 106. However, in this embodiment, the tab 614 itself may provide the constraint of the second end 244 of the wearpad 204. That is, the fastener 612 may be located on an opposite side of a wall 620 with respect to the wearpad 204 such that the slot extends though the wall 620 to reach a location adjacent to the wearpad 204. Advantageously, the fastener 612 may be reached from a location inside the opening 128 of the boom 106, which may be more easily accessible with respect to other locations, particularly when the boom 106 is an inner boom surrounded by an outer boom (not shown).

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

The invention claimed is:

1. A housing arrangement for a wearpad, the housing arrangement comprising:
- a boom for a telescopic boom assembly, which telescopically adjusts along a first axis;
- a plate for contacting at least one end of the wearpad when the wearpad is installed adjacent to the boom; and
- a fastener for rotatably securing the plate to a surface of the boom,
  - wherein the plate includes a tab, wherein the boom includes a slot, wherein the slot is configured to constrain the tab in at least two directions when the slot receives the tab; and
  - wherein an axis of rotation of the plate is parallel to the first axis.

2. The housing arrangement of claim 1, wherein the boom includes an extension with the surface for securing to the plate.

3. The housing arrangement of claim 1, further comprising a fixed member for contacting a first end of the wearpad, wherein the plate contacts a second end of the wearpad when the wearpad is installed.

4. The housing arrangement of claim 1, wherein the tab is located on the plate, and wherein the tab contacts the at least one end of the wearpad when the wearpad is installed.

5. The housing arrangement of claim 1, wherein the housing arrangement consists of a single fastener for securing the plate to the boom.

6. A housing arrangement for a wearpad, which is attachable near an end of a boom of a telescopic boom assembly, the housing arrangement comprising:
- a plate configured to be attached to the end of the boom and to, when attached, restrain a first end of the wearpad;
- a fixed member configured to constrain a second end of the wearpad;
- a fastener for attaching the plate to the end of the boom; and
- a tab extending from an edge of the plate, wherein:
  - the tab is configured to insert into a slot of the boom; and
  - the tab, when inserted into the slot, is constrained in at least two direction.

7. The housing arrangement of claim 6, wherein the plate is rotatable about the fastener.

8. The housing arrangement of claim 6, wherein the further comprising, a fixed member is configured to be attached to the boom at a position that, relative to the plate, is further away from the end of the boom, wherein the fixed member is configured to constrain a second end of the wearpad.

* * * * *